(12) United States Patent
Kagawa et al.

(10) Patent No.: US 9,410,033 B2
(45) Date of Patent: Aug. 9, 2016

(54) RUBBER COMPOSITION FOR UNDERTREAD, AND PNEUMATIC TIRE

(71) Applicant: SUMITOMO RUBBER INDUSTRIES, LTD., Kobe-shi, Hyogo (JP)

(72) Inventors: Yoshihiro Kagawa, Kobe (JP); Naoya Ichikawa, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/483,966

(22) Filed: Sep. 11, 2014

(65) Prior Publication Data

US 2014/0378593 A1    Dec. 25, 2014

Related U.S. Application Data

(62) Division of application No. 13/672,880, filed on Nov. 9, 2012, now abandoned.

(30) Foreign Application Priority Data

Nov. 11, 2011 (JP) ................ 2011-247879

(51) Int. Cl.
| | |
|---|---|
| C08L 65/02 | (2006.01) |
| C08L 7/02 | (2006.01) |
| C08L 15/00 | (2006.01) |
| C08K 3/00 | (2006.01) |
| B60C 1/00 | (2006.01) |
| C08C 1/04 | (2006.01) |

(52) U.S. Cl.
CPC ............ *C08L 7/02* (2013.01); *B60C 1/0016* (2013.04); *C08K 3/0033* (2013.01); *C08L 15/00* (2013.01); *C08L 65/02* (2013.01); *C08C 1/04* (2013.01); *Y02T 10/862* (2013.01)

(58) Field of Classification Search
None
See application file for complete search history.

(56) References Cited

U.S. PATENT DOCUMENTS

| | | | |
|---|---|---|---|
| 2,140,527 A | 12/1938 | Haynes et al. | |
| 2,486,720 A | 11/1949 | Perkerson | |
| 2,650,891 A | 9/1953 | Buckwalter | |
| 2,905,567 A | 9/1959 | Allen | |
| 3,709,845 A | 1/1973 | Boustany et al. | |
| 3,716,513 A | 2/1973 | Burke, Jr. | |
| 3,959,194 A | 5/1976 | Adelmann | |
| 4,508,860 A | 4/1985 | Hawes | |
| 4,835,216 A | 5/1989 | Morikawa et al. | |
| 5,000,092 A | 3/1991 | Best | |
| 5,017,636 A | 5/1991 | Hattori et al. | |
| 5,290,830 A | 3/1994 | Tung et al. | |
| 5,396,940 A | 3/1995 | Segatta et al. | |
| 5,569,740 A | 10/1996 | Tanaka et al. | |
| 5,908,893 A * | 6/1999 | Kawasaki et al. | 524/575.5 |
| 5,967,211 A | 10/1999 | Lucas et al. | |
| 6,117,545 A | 9/2000 | Cavaille et al. | |
| 6,306,955 B1 | 10/2001 | Kawasaki et al. | |
| 6,376,587 B1 | 4/2002 | Ajiro et al. | |
| 6,489,389 B1 | 12/2002 | Ohta et al. | |
| 6,703,497 B1 | 3/2004 | Ladouce et al. | |
| 7,427,646 B2 | 9/2008 | Kondou | |
| 8,022,136 B2 | 9/2011 | Yano et al. | |
| 8,163,821 B2 | 4/2012 | Hiro | |
| 8,273,804 B2 | 9/2012 | Nishimura | |
| 8,623,956 B2 | 1/2014 | Sugimoto et al. | |
| 8,633,275 B2 | 1/2014 | Sakaki et al. | |
| 8,658,728 B2 | 2/2014 | Ichikawa et al. | |
| 8,658,730 B2 | 2/2014 | Ichikawa | |
| 8,809,450 B2 | 8/2014 | Sakaki et al. | |
| 8,813,798 B2 | 8/2014 | Tsumori et al. | |
| 8,857,482 B2 | 10/2014 | Taguchi et al. | |
| 8,875,765 B2 | 11/2014 | Tsumori et al. | |
| 2003/0060551 A1 | 3/2003 | Mizuno et al. | |
| 2003/0083516 A1 | 5/2003 | Korth et al. | |
| 2004/0110889 A1 | 6/2004 | Yagi et al. | |
| 2004/0266937 A1 | 12/2004 | Yagi et al. | |
| 2005/0027060 A1 | 2/2005 | Yagi et al. | |
| 2005/0148723 A1 | 7/2005 | Kondou | |
| 2005/0234186 A1 | 10/2005 | Kondou | |

(Continued)

FOREIGN PATENT DOCUMENTS

| | | |
|---|---|---|
| CN | 1572825 A | 2/2005 |
| CN | 1692128 A | 11/2005 |

(Continued)

OTHER PUBLICATIONS

"Shinpan Kobunshi Jiten" (Polymer Dictionary, New Edition), 6th Imp., published Mar. 20, 2001, p. 448, with partial translation of lines 21-30 of the left column of p. 448 (3 pages total).
Extended European Search Report, dated Aug. 27, 2010, for European Application No. 08830800.2.
Food Chemicals Codex, 7th Edition, Calcium Lignosulfonate, p. 142, 2010.
The Chemical Society of Japan, "Hyojun Kagaku Yogo Jiten" (Standard Dictionary of Chemical Terms), 2nd Ed., published Mar. 31, 2005, pp. 672-673, with partial translation of lines 5-9 of the left column of p. 673 (3 pages total).
Tokai Carbon Co., Ltd., "SEAST SO (FEF)", Physicochemical Properties, Product Information, retrieved Feb. 20, 2014, 3 pages, http://www.tokaicarbon.co.jp/en/products/carbon_b/seast/.
U.S. Notice of Allowance for U.S. Appl. No. 13/350,407, dated Apr. 23, 2014.

(Continued)

*Primary Examiner* — Nicole M Buie-Hatcher
*Assistant Examiner* — Chelsea M Christensen
(74) *Attorney, Agent, or Firm* — Birch, Stewart, Kolasch & Birch, LLP

(57) ABSTRACT

The present invention provides a rubber composition for an undertread, which has improved in processability, fuel economy, and tensile properties in a balanced manner, and also provides a pneumatic tire formed from the rubber composition. The present invention relates to a rubber composition for an undertread, including: a rubber component containing a modified natural rubber having a phosphorus content of 200 ppm or less; and carbon black and/or a white filler, wherein the modified natural rubber is contained in an amount of 5% by mass or more per 100% by mass of the rubber component.

2 Claims, No Drawings

(56) References Cited

U.S. PATENT DOCUMENTS

| | | |
|---|---|---|
| 2006/0252879 A1 | 11/2006 | Tanaka et al. |
| 2007/0059232 A1 | 3/2007 | Stenzel et al. |
| 2007/0100061 A1 | 5/2007 | Hattori et al. |
| 2007/0197688 A1 | 8/2007 | Tsukada et al. |
| 2007/0241480 A1 | 10/2007 | Kanenari et al. |
| 2008/0009570 A1 | 1/2008 | Miyazaki |
| 2008/0185087 A1 | 8/2008 | Galimberti et al. |
| 2009/0000721 A1 | 1/2009 | Imoto et al. |
| 2009/0088496 A1 | 4/2009 | Miyasaka et al. |
| 2009/0099281 A1 | 4/2009 | Sakurai et al. |
| 2010/0076118 A1 | 3/2010 | Yano et al. |
| 2010/0206444 A1 | 8/2010 | Kawasaki |
| 2010/0294407 A1 | 11/2010 | Kushida |
| 2011/0094648 A1 | 4/2011 | Horiguchi |
| 2011/0094649 A1 | 4/2011 | Miyazaki |
| 2011/0136939 A1 | 6/2011 | Lechtenboehmer et al. |
| 2011/0166254 A1 | 7/2011 | Nishimura |
| 2011/0172339 A1 | 7/2011 | Satou |
| 2011/0178235 A1 | 7/2011 | Sugimoto |
| 2011/0184118 A1 | 7/2011 | Sugimoto et al. |
| 2011/0230613 A1 | 9/2011 | Hiro |
| 2011/0253285 A1 | 10/2011 | Ichikawa et al. |
| 2011/0294949 A1 | 12/2011 | Sakaki et al. |
| 2012/0214911 A1 | 8/2012 | Yano et al. |
| 2013/0030083 A1 | 1/2013 | Taguchi et al. |
| 2013/0066021 A1 | 3/2013 | Ichikawa et al. |
| 2013/0098523 A1 | 4/2013 | Tsumori et al. |
| 2013/0102722 A1 | 4/2013 | Tsumori et al. |
| 2013/0123387 A1 | 5/2013 | Kagawa et al. |

FOREIGN PATENT DOCUMENTS

| | | | |
|---|---|---|---|
| CN | 1832967 A | 9/2006 | |
| CN | 1946744 A | 4/2007 | |
| CN | 102245644 A | 11/2011 | |
| CS | 237729 B1 | 10/1985 | |
| EP | 0328261 A1 | 8/1989 | |
| EP | 0905186 A1 | 3/1999 | |
| EP | 1484359 A1 | 12/2004 | |
| EP | 1568713 A1 | 8/2005 | |
| EP | 1650253 A1 | 4/2006 | |
| EP | 1652862 A1 | 5/2006 | |
| EP | 1816144 A1 | 8/2007 | |
| EP | 101270219 A | 9/2008 | |
| EP | 2072574 A1 | 6/2009 | |
| EP | 2154192 A1 | 2/2010 | |
| EP | 2223928 A1 | 9/2010 | |
| EP | 2284022 A1 | 2/2011 | |
| EP | 2333008 A1 | 6/2011 | |
| EP | 2333009 A1 | 6/2011 | |
| EP | 2366558 A1 | 9/2011 | |
| EP | 237892 A1 | 10/2011 | |
| EP | 2476708 A1 | 7/2012 | |
| EP | 2615127 A2 | 7/2013 | |
| GB | 164392 A | 6/1921 | |
| GB | 240939 A | 10/1925 | |
| JP | 4-356205 A | 12/1992 | |
| JP | 5-301994 A | 11/1993 | |
| JP | 6-87306 A | 3/1994 | |
| JP | 6-329702 A | 11/1994 | |
| JP | 06-329838 | 11/1994 | |
| JP | 7-149955 A | 6/1995 | |
| JP | 07-196850 A | 8/1995 | |
| JP | 8-12814 A | 1/1996 | |
| JP | 08-143606 A | 6/1996 | |
| JP | 11-12306 A | 1/1999 | |
| JP | 11-78437 A | 3/1999 | |
| JP | 11-129711 A | 5/1999 | |
| JP | 11-222012 A | 8/1999 | |
| JP | 11-513425 A | 11/1999 | |
| JP | 2000-95898 A | 4/2000 | |
| JP | 2000-344955 A | 12/2000 | |
| JP | 2001-114939 A | 4/2001 | |
| JP | 2002-503621 A | 2/2002 | |
| JP | 2002-155164 A | 5/2002 | |
| JP | 3294901 B2 | 6/2002 | |
| JP | 2002-524618 A | 8/2002 | |
| JP | 2002-338734 A | 11/2002 | |
| JP | 2003-64221 A | 3/2003 | |
| JP | 2003-94918 A | 4/2003 | |
| JP | 2003-320804 A | 11/2003 | |
| JP | 2004-59803 A | 2/2004 | |
| JP | 2004-67027 A | 3/2004 | |
| JP | 2004-091715 A | 3/2004 | |
| JP | 2004-182905 A | 7/2004 | |
| JP | 2004-250546 A | 9/2004 | |
| JP | 2004-262973 A | 9/2004 | |
| JP | 2004-359773 A | 12/2004 | |
| JP | 2005-41960 A | 2/2005 | |
| JP | 2005-68240 A | 3/2005 | |
| JP | 2005-75856 A | 3/2005 | |
| JP | 2005-82622 A | 3/2005 | |
| JP | 2005-82766 A | 3/2005 | |
| JP | 2005-126604 A | 5/2005 | |
| JP | 2005-133025 A | 5/2005 | |
| JP | 2005-325206 A | 11/2005 | |
| JP | 2005-325307 A | 11/2005 | |
| JP | 2006-16622 A | 1/2006 | |
| JP | 2006-36926 A | 2/2006 | |
| JP | 2006-96926 A | 4/2006 | |
| JP | 2006-104455 A | 4/2006 | |
| JP | 2006-152045 A | 6/2006 | |
| JP | 2006-152171 A | 6/2006 | |
| JP | 2006-152211 A | 6/2006 | |
| JP | 2006-206837 A | 8/2006 | |
| JP | 2006-206864 A | 8/2006 | |
| JP | 2006-281744 A | 10/2006 | |
| JP | 2006-307018 A | 11/2006 | |
| JP | 2007-131730 A | 5/2007 | |
| JP | 2007-145898 A | 6/2007 | |
| JP | 2007-169431 A | 7/2007 | |
| JP | 2008-106099 A | 5/2008 | |
| JP | 2008-156446 A | 7/2008 | |
| JP | 2008-214608 A | 9/2008 | |
| JP | 2008-308615 A | 12/2008 | |
| JP | 2009-1680 A | 1/2009 | |
| JP | 2009-13196 A | 1/2009 | |
| JP | 2009-13197 A | 1/2009 | |
| JP | 2009-51955 A | 3/2009 | |
| JP | 2009-67929 A | 4/2009 | |
| JP | 2009-84564 A | 4/2009 | |
| JP | 2009-108308 A | 5/2009 | |
| JP | 2009-191132 | 8/2009 | |
| JP | 2009-191198 A | 8/2009 | |
| JP | 2009-202865 A | 9/2009 | |
| JP | 2009-262835 A | 11/2009 | |
| JP | 2010-70747 A | 4/2010 | |
| JP | 2010-111785 A | 5/2010 | |
| JP | 2010-138359 | 6/2010 | |
| JP | 2010-144001 A | 7/2010 | |
| JP | 2010-173513 A | 8/2010 | |
| JP | 2010-174169 A | 8/2010 | |
| JP | 2010-242023 A | 10/2010 | |
| JP | 2010-248282 A | 11/2010 | |
| JP | 4581116 B2 | 11/2010 | |
| JP | 2010-275642 A | 12/2010 | |
| JP | 2011-63651 A | 3/2011 | |
| JP | 2011-153221 A | 8/2011 | |
| JP | 2011-153222 A | 8/2011 | |
| JP | 2011-157473 A | 8/2011 | |
| JP | 2011-225680 A | 11/2011 | |
| JP | 2011-231214 A | 11/2011 | |
| JP | 2011-256311 A | 12/2011 | |
| JP | 2012-1571 A | 1/2012 | |
| WO | WO 03/082925 A1 | 10/2003 | |
| WO | WO 2005/012365 A1 | 2/2005 | |
| WO | WO 2005/092971 A1 | 10/2005 | |
| WO | WO 2009/096113 A1 | 8/2009 | |

(56) References Cited

FOREIGN PATENT DOCUMENTS

| WO | WO 2010/071106 A1 | 6/2010 |
|----|-------------------|--------|
| WO | WO 2011/049162 A1 | 4/2011 |
| WO | WO 2011/096399 A1 | 8/2011 |

OTHER PUBLICATIONS

U.S. Notice of Allowance for U.S. Appl. No. 14/013,286, dated Dec. 29, 2014.
U.S. Office Action for U.S. Appl. No. 13/350,407, dated Jan. 17, 2013.
U.S. Office Action for U.S. Appl. No. 13/350,407, dated May 23, 2013.
U.S. Office Action for U.S. Appl. No. 13/350,407, dated Oct. 23, 2013.
U.S. Office Action for U.S. Appl. No. 13/699,533, dated Jan. 15, 2015.
U.S. Office Action for U.S. Appl. No. 13/739,796, dated Feb. 27, 2014.
U.S. Office Action for U.S. Appl. No. 13/739,796, dated Jan. 28, 2015.
U.S. Office Action for U.S. Appl. No. 13/739,796, dated Jul. 11, 2014.
U.S. Office Action for U.S. Appl. No. 13/739,796, dated Sep. 24, 2014.
U.S. Office Action for U.S. Appl. No. 13/748,168, dated Aug. 1, 2014.
U.S. Office Action for U.S. Appl. No. 13/748,168, dated May 7, 2014.
U.S. Office Action for U.S. Appl. No. 13/748,168, dated Nov. 6, 2014.
U.S. Office Action for U.S. Appl. No. 13/752,507, dated Aug. 14, 2014.
U.S. Office Action for U.S. Appl. No. 13/752,507, dated Dec. 17, 2014.
U.S. Office Action for U.S. Appl. No. 13/752,507, dated Jan. 29, 2015.
U.S. Office Action for U.S. Appl. No. 13/752,507, dated Mar. 14, 2014.
U.S. Office Action for U.S. Appl. No. 13/752,711, dated Dec. 26, 2014.
U.S. Office Action for U.S. Appl. No. 13/752,711, dated Jun. 5, 2014.
U.S. Office Action for U.S. Appl. No. 13/752,711, dated Mar. 17, 2014.
U.S. Office Action for U.S. Appl. No. 13/752,711, dated Sep. 18, 2014.
U.S. Office Action for U.S. Appl. No. 13/777,627, dated Jan. 30, 2015.
U.S. Office Action for U.S. Appl. No. 13/777,627, dated Jul. 1, 2014.
U.S. Office Action for U.S. Appl. No. 14/013,286, dated Aug. 6, 2014.
U.S. Office Action for U.S. Appl. No. 14/107,614, dated Oct. 31, 2014.
U.S. Office Action, dated Feb. 23, 2015, issued in U.S. Appl. No. 13/752,711.
U.S. Office Action, dated Jun. 17, 2015, issued in U.S. Appl. No. 13/777,627.
Notice of Allowance with Examiner's Reasons for Allowance dated Sep. 9, 2013 for U.S. Appl. No. 13/117,182.
Rhodia, "Rhodia Silcea launches Zeosil® Premium, a new generation of high surface-area silica offering lower resistance and greater performance," Rhodia Silica News Release, Solvay-Rhodia, Lyon, France, Feb. 27, 2007, 3 pages.
U.S. Notice of Allowance dated Aug. 28, 2013 for U.S. Appl. No. 13/013,849.
U.S. Notice of Allowance dated Feb. 1, 2012 for U.S. Appl. No. 13/048,914.
U.S. Notice of Allowance dated Feb. 14, 2012 for U.S. Appl. No. 12/983,338.
U.S. Office Action dated Mar. 23, 2011 for U.S. Appl. No. 12/983,338.
U.S. Office Action dated Nov. 12, 2013 for U.S. Appl. No. 13/560,090.
U.S. Office Action dated Nov. 4, 2013 for U.S. Appl. No. 13/616,310.
U.S. Office Action dated Sep. 15, 2011 for U.S. Appl. No. 12/983,338.
U.S. Office Action dated Sep. 19, 2011 for U.S. Appl. No. 13/048,914.
U.S. Office Action for copending U.S. Appl. No. 13/006,606 dated May 9, 2013.
U.S. Office Action for copending U.S. Appl. No. 13/006,606 dated Oct. 10, 2012.
U.S. Office Action for copending U.S. Appl. No. 13/013,849 dated Mar. 13, 2013.
U.S. Office Action for copending U.S. Appl. No. 13/117,182 dated Feb. 5, 2013.
U.S. Office Action for copending U.S. Appl. No. 13/117,182 dated May 17, 2013.
U.S. Office Action for copending U.S. Appl. No. 13/560,090 dated Aug. 2, 2013.
U.S. Office Action, dated Mar. 4, 2014, for U.S. Appl. No. 13/560,090.
Database WPI Week 200570, Thomson Scientific, London, GB; AN 2005-684076, XP-002673748, Apr. 18, 2012, 2 pages.
International Search Report for International Application No. PCT/JP2009/070824, dated Mar. 9, 2010.
International Search Report for International Application No. PCT/JP2011/063248, dated Sep. 13, 2011.
Japanese Office Action for Japanese Application No. 2008-318710, dated Mar. 9, 2010.
Japanese Office Action for Japanese Application No. 2008-318711, dated Mar. 9, 2010.
Japanese Office Action for Japanese Application No. 2009-019711, dated Mar. 9, 2010.
U.S. Notice of Allowance for U.S. Appl. No. 13/006,606, dated Oct. 7, 2014.
U.S. Notice of Allowance for U.S. Appl. No. 13/139,536, dated Dec. 4, 2013.
U.S. Notice of Allowance for U.S. Appl. No. 13/139,536, dated Oct. 18, 2013.
U.S. Notice of Allowance for U.S. Appl. No. 13/560,090, dated Jun. 17, 2014.
U.S. Notice of Allowance for U.S. Appl. No. 13/616,310, dated Aug. 27, 2014.
U.S. Notice of Allowance for U.S. Appl. No. 13/616,310, dated Oct. 1, 2014.
U.S. Notice of Allowance for U.S. Appl. No. 13/776,126, dated Dec. 26, 2013.
U.S. Office Action for U.S. Appl. No. 13/139,536, dated Jan. 27, 2012.
U.S. Office Action for U.S. Appl. No. 13/139,536, dated Jul. 10, 2013.
U.S. Office Action for U.S. Appl. No. 13/139,536, dated Jun. 29, 2012.
U.S. Office Action for U.S. Appl. No. 13/139,536, dated Mar. 14, 2013.
U.S. Office Action for U.S. Appl. No. 13/139,536, dated Oct. 12, 2012.
U.S. Office Action for U.S. Appl. No. 13/139,536, dated Oct. 27, 2011.
U.S. Office Action for U.S. Appl. No. 13/616,310 dated May 7, 2014.
U.S. Office Action for U.S. Appl. No. 13/672,880, dated Jun. 13, 2014.
U.S. Office Action for U.S. Appl. No. 13/672,880, dated Mar. 28, 2013.
U.S. Office Action for U.S. Appl. No. 13/672,880, dated Sep. 13, 2013.
U.S. Office Action for U.S. Appl. No. 13/699,533, dated Jun. 23, 2014.
U.S. Office Action for U.S. Appl. No. 13/776,126, dated May 23, 2013.

\* cited by examiner

RUBBER COMPOSITION FOR UNDERTREAD, AND PNEUMATIC TIRE

CROSS REFERENCE TO RELATED APPLICATIONS

This application is a Divisional of copending application Ser. No. 13/672,880, filed on Nov. 9, 2012, which claims priority under 35 U.S.C. §119(a) to Japanese Patent Application No. 2011-247879, filed in Japan on Nov. 11, 2011, all of which are hereby expressly incorporated by reference into the present application.

TECHNICAL FIELD

The present invention relates to a rubber composition for an undertread, and a pneumatic tire formed from the rubber composition.

BACKGROUND ART

Vehicles have been designed to consume less fuel by decreasing the rolling resistance of tires so as to suppress heat build-up. These days, the demand for tires with higher fuel economy has been increasing. Accordingly, fuel economy (lower heat build-up) is required not only for treads and sidewalls but also for other tire components such as undertreads.

Examples of known methods for reducing the heat build-up of rubber compositions for undertreads include a method using semi-reinforcing filler, a method involving reducing the amount of filler, and a method using silica as filler. However, these methods reduce the reinforcement of the rubber compositions, thereby leading to a decrease in tensile properties. Thus, it has been difficult to improve fuel economy and tensile properties at the same time.

Meanwhile, natural rubber is commonly used for undertreads. Natural rubber has a higher Mooney viscosity than other synthetic rubbers and thus has poor processability. Therefore, natural rubber is usually mixed with a peptizer and masticated so as to reduce the Mooney viscosity before use. Hence, the productivity is low when natural rubber is used. Further, mastication causes molecular chain scission of natural rubber, which disadvantageously leads to a loss of intrinsic properties (e.g. fuel economy and rubber strength) of the high-molecular-weight polymer.

Although Patent Literature 1 suggests the use of natural rubber that is deproteinized such that the total nitrogen content falls to 0.1% by weight or less, there is still room for improvement in improving processability, fuel economy, and tensile properties in a balanced manner.

CITATION LIST

Patent Literature

Patent Literature 1: JP-A H06-329838

SUMMARY OF INVENTION

Technical Problem

The present invention aims to provide a rubber composition for an undertread which can solve the above-described problems and has improved in processability, fuel economy, and tensile properties in a balanced manner, and a pneumatic tire formed therefrom.

Solution to Problem

The present invention relates to a rubber composition for an undertread, including: a rubber component containing a modified natural rubber having a phosphorus content of 200 ppm or less; and at least one of carbon black and a white filler, wherein the modified natural rubber is contained in an amount of 5% by mass or more per 100% by mass of the rubber component.

Preferably, the modified natural rubber has a nitrogen content of 0.3% by mass or less and has a gel content determined as a toluene-insoluble fraction of 20% by mass or less.

The modified natural rubber is preferably obtained by saponifying natural rubber latex.

The modified natural rubber is preferably obtained by the steps of: (A) saponifying natural rubber latex to prepare a saponified natural rubber latex; (B) coagulating the saponified natural rubber latex and treating the resulting coagulated rubber with alkali; and (C) washing the resulting rubber until the phosphorus content in rubber falls to 200 ppm or less.

The white filler is preferably silica.

The present invention also relates to a pneumatic tire, including an undertread formed from the rubber composition.

Advantageous Effects of Invention

The present invention provides a rubber composition for an undertread including a modified natural rubber having a specific content (200 ppm or less) of phosphorus, and also including carbon black and/or a white filler, and therefore it is possible to improve processability, fuel economy, and tensile properties in a balanced manner.

DESCRIPTION OF EMBODIMENTS

The rubber composition for an undertread of the present invention includes a modified natural rubber having a phosphorus content of 200 ppm or less, and also includes carbon black and/or a white filler.

The use of a modified natural rubber obtained by decreasing or removing phospholipids in natural rubber makes it possible to improve fuel economy. An unvulcanized rubber composition containing the modified natural rubber is excellent in processability and thus can be mixed sufficiently well without the special step mastication. Therefore, a reduction in the properties (e.g. tensile properties) of natural rubber due to mastication can be suppressed, and fuel economy, tensile properties and the like can be effectively enhanced. Further, by reducing not only the amount of phospholipids but also the amounts of proteins and gel fraction, it is possible to further improve these properties.

The modified natural rubber is also excellent in productivity because it is free from contaminants such as pebbles and woodchips and therefore requires no step of removing such contaminants.

Thus, the present invention achieves a good balance of processability, fuel economy, and tensile properties (particularly, elongation at break after thermal aging).

The modified natural rubber has a phosphorus content of 200 ppm or less. With the phosphorus content of more than 200 ppm, the tan δ tends to increase to lead to poor fuel economy, and the Mooney viscosity of the unvulcanized rubber composition also tends to increase to lead to poor processability. The phosphorus content is preferably 150 ppm or less, and more preferably 100 ppm or less. Herein, the phosphorus content can be measured by conventional methods such as ICP optical emission spectrometry. The phosphorus is derived from phospholipids (phosphorus compounds).

The modified natural rubber preferably has a nitrogen content of 0.3% by mass or less, and more preferably 0.15% by mass or less. A nitrogen content of more than 0.3% by mass tends to cause an increase in Mooney viscosity during storage to deteriorate processability, and also tends to cause poor fuel economy. The nitrogen content can be determined by conventional methods such as the Kjeldahl method. The nitrogen is derived from proteins.

The modified natural rubber preferably has a gel content of 20% by mass or less, more preferably 10% by mass or less, and still more preferably 7% by mass or less. A gel content of more than 20% by mass tends to lead to poor processability and poor fuel economy. The gel content refers to a value determined as a fraction that is insoluble in toluene which is a non-polar solvent. Hereinafter, it is referred to simply as "gel content" or "gel fraction". The gel content is determined by the following method. First, a natural rubber sample is immersed in anhydrous toluene and left in a dark place protected from light for one week. Then, the toluene solution is centrifuged at $1.3 \times 10^5$ rpm for 30 minutes so that an insoluble gel fraction and a toluene-soluble fraction are separated from each other. Methanol is added to the insoluble gel fraction for solidification, and the resulting solid is then dried. Finally, the gel content can be determined from the ratio of the mass of the dried gel fraction to the initial mass of the sample.

Preferably, the modified natural rubber contains substantially no phospholipids. Here, the phrase "contains substantially no phospholipids" means that no phospholipid peaks are observed in a range of −3 to 1 ppm in $^{31}$P-NMR measurement of an extract obtained by chloroform extraction from a natural rubber sample. The phosphorus peaks present in a range of −3 to 1 ppm are peaks from a phosphate ester structure of the "phospho" of phospholipids.

The modified natural rubber can be prepared by, for example, the method disclosed in JP-A 2010-138359. In particular, the modified natural rubber is preferably prepared by a method including the steps of: (A) saponifying natural rubber latex to prepare a saponified natural rubber latex; (B) coagulating the saponified natural rubber latex and treating the resulting coagulated rubber with alkali; and (C) washing the resulting rubber until the phosphorus content in rubber falls to 200 ppm or less. The phosphorus content, nitrogen content, and the like can be effectively reduced by this method. The use of the modified natural rubber obtained by the method enables to significantly improve processability, fuel economy, and tensile properties, leading to the achievement of these properties at high levels. Additionally, after coagulation with acid, the remaining acid is neutralized by the alkali treatment, and acid-induced deterioration of rubber can thereby be prevented.

In the above preparation method, natural rubber latex can be saponified by adding thereto an alkali and, if necessary, a surfactant, followed by standing still for a certain period at a predetermined temperature. Here, stirring or the like may be performed, if necessary. With this method, it is possible to reduce the phosphorus content and the nitrogen content in natural rubber.

As the natural rubber latex, conventionally known latexes such as raw latex, purified latex, and high ammonia latex may be used. Examples of usable alkalis in the saponification include sodium hydroxide, potassium hydroxide, calcium hydroxide, and amine compounds. In particular, sodium hydroxide and potassium hydroxide are preferred. As the surfactant, known anionic, nonionic, or amphoteric surfactants may be used. In particular, anionic surfactants are preferred, and sulfonate anionic surfactants are more preferred.

The amount of the alkali added for saponification can be appropriately determined, and is preferably 0.1 to 10 parts by mass per 100 parts by mass of the solids in natural rubber latex. The amount of the surfactant added is preferably 0.01 to 6.0 parts by mass per 100 parts by mass of the solids in natural rubber latex. The temperature and the time of saponification can also be appropriately determined and are, in general, approximately at 20 to 70° C. for 1 to 72 hours.

After the saponification, the resulting saponified natural rubber latex is coagulated, and the coagulated rubber may be broken if necessary. Subsequently, the coagulated rubber or broken rubber is subjected to alkali treatment by contact with alkali. The alkali treatment enables to efficiently reduce the nitrogen content and the like in rubber, and therefore the effects of the present invention can be further enhanced. Examples of the coagulation method include a method in which an acid such as formic acid is added to latex. The alkali treatment method is not particularly limited as long as the method involves bringing the rubber into contact with alkali. Examples of the alkali treatment method include a method of immersing the coagulated rubber or broken rubber in an alkali solution. Examples of usable alkalis in the alkali treatment include, in addition to the alkalis mentioned above for the saponification, alkali metal carbonates such as potassium carbonate, sodium carbonate, sodium hydrogen carbonate, potassium hydrogen carbonate, lithium carbonate, and lithium hydrogen carbonate, and aqueous ammonia. In particular, alkali metal carbonates, preferably sodium carbonate and potassium carbonate, are preferred because they can highly contribute to the effects of the present invention.

In the case where the alkali treatment is performed by immersion as mentioned above, the treatment may be carried out by immersing the rubber (broken rubber) in an aqueous alkali solution with a concentration of preferably 0.1 to 5% by mass, more preferably 0.2 to 3% by mass. Such immersion further reduces the nitrogen content and the like in rubber.

In the case where the alkali treatment is performed by the immersion, the temperature during the alkali treatment can be appropriately determined, and is typically preferably 20 to 70° C. The time of the alkali treatment, although it depends on the treatment temperature, is preferably 1 to 20 hours, more preferably 2 to 12 hours, considering sufficient treatment and productivity.

After the alkali treatment, washing is carried out, thereby reducing the phosphorus content in rubber. Washing may be carried out by, for example, a method in which the rubber fraction is diluted and washed with water, followed by centrifugation, or alternatively followed by leaving the dilution at rest to allow the rubber to float and then discharging only the water phase to collect the rubber fraction. In the case of centrifugation, dilution with water is first performed so that the rubber content of the natural rubber latex is 5 to 40% by mass, preferably 10 to 30% by mass. Subsequently, centrifugation may be performed at 5000 to 10000 rpm for 1 to 60 minutes, and washing may be repeated until a desired phosphorus content is obtained. Also, in the case of leaving the dilution at rest to allow the rubber to float, washing may be carried out by repeating addition of water and stirring until a desired phosphorus content is obtained. After the completion of washing, the resulting rubber is dried, thereby giving a modified natural rubber usable in the present invention.

In the rubber composition of the present invention, the modified natural rubber content per 100% by mass of the rubber component is 5% by mass or more, preferably 50% by mass or more, more preferably 70% by mass or more, and still more preferably 80% by mass or more. With the content of less than 5% by mass, it may not be possible to sufficiently improve processability, fuel economy, and tensile properties. The upper limit of the content may be 100% by mass, or may be 90% by mass or less.

Examples of rubbers usable in addition to the modified natural rubber in the rubber component in the present invention include diene rubbers such as natural rubber (NR) (unmodified), isoprene rubber (IR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). Of these, NR is preferred because it leads to good processability and tensile properties.

The NR content per 100% by mass of the rubber component is preferably 5% by mass or more, and more preferably 15% by mass or more. The content is preferably 95% by mass or less, and more preferably 25% by mass or less. The NR content in the range allows excellent processability, fuel economy, and tensile properties.

The total content of the modified natural rubber and NR per 100% by mass of the rubber component is preferably 80% by mass or more, and more preferably 100% by mass. The total content in the range leads to excellent processability, fuel economy, and tensile properties.

Examples of the carbon black include, but are not particularly limited to, GPF, FEF, HAF, ISAF, and SAF. The addition of carbon black provides reinforcement as well as allowing the effects of the present invention to be achieved well.

The nitrogen adsorption specific surface area ($N_2SA$) of carbon black is preferably 30 $m^2/g$ or more, and more preferably 60 $m^2/g$ or more. An $N_2SA$ of less than 30 $m^2/g$ may lead to insufficient reinforcement. The $N_2SA$ of carbon black is preferably 180 $m^2/g$ or less, more preferably 130 $m^2/g$ or less, and still more preferably 100 $m^2/g$ or less. With the $N_2SA$ of more than 180 $m^2/g$, dispersion of the carbon black tends to be difficult, thereby leading to poor fuel economy.

The $N_2SA$ of carbon black herein is determined in accordance with JIS K 6217-2:2001.

The dibutyl phthalate (DBP) oil absorption of carbon black is preferably 50 mL/100 g or more, more preferably 60 mL/100 g or more, and still more preferably 65 mL/100 g or more. Also, the oil absorption is preferably 100 mL/100 g or less, more preferably 90 mL/100 g or less, and still more preferably 80 mL/100 g or less. The oil absorption in the range leads to the achievement of excellent tensile properties, and therefore the effects of the present invention can be favorably obtained.

The DBP oil absorption of carbon black is determined in accordance with JIS K6217-4:2001.

The carbon black content is preferably 20 parts by mass or more, more preferably 35 parts by mass or more, and still more preferably 45 parts by mass or more, per 100 parts by mass of the rubber component. A carbon black content of less than 20 parts by mass may result in insufficient reinforcement. The carbon black content is preferably 90 parts by mass or less, more preferably 80 parts by mass or less, and still more preferably 70 parts by mass or less, per 100 parts by mass of the rubber component. A carbon black content of more than 90 parts by mass tends to deteriorate fuel economy.

Examples of the white filler include those commonly used in the rubber industry, including silica, calcium carbonate, mica such as sericite, aluminum hydroxide, magnesium oxide, magnesium hydroxide, clay, talc, alumina, and titanium oxide. Of these, silica is preferred in terms of fuel economy and rubber strength.

The silica is not particularly limited. Examples thereof include dry silica (anhydrous silica) and wet silica (hydrous silica). Wet silica (hydrous silica) is preferred because such silica contains a large number of silanol groups.

The nitrogen adsorption specific surface area ($N_2SA$) of silica is preferably 90 $m^2/g$ or more, and more preferably 100 $m^2/g$ or more. An $N_2SA$ of less than 90 $m^2/g$ tends to lead to insufficient reinforcement. Also, the $N_2SA$ of silica is preferably 250 $m^2/g$ or less, more preferably 220 $m^2/g$ or less, and still more preferably 120 $m^2/g$ or less. An $N_2SA$ of more than 250 $m^2/g$ tends to lead to a decrease in silica dispersibility, thus deteriorating processability.

The nitrogen adsorption specific surface area of silica is a value determined by the BET method in accordance with ASTM D3037-81.

The white filler content is preferably 5 parts by mass or more, and more preferably 15 parts by mass or more, per 100 parts by mass of the rubber component. The content is preferably 100 parts by mass or less, and more preferably 35 parts by mass or less. The content in the range allows good processability, fuel economy, and tensile properties.

The silica content is preferably 5 parts by mass or more, more preferably 7 parts by mass or more, and still more preferably 15 parts by mass or more, per 100 parts by mass of the rubber component. The content is preferably 100 parts by mass or less, more preferably 90 parts by mass or less, and still more preferably 35 parts by mass or less. The content in the range allows good processability, fuel economy, and tensile properties.

When silica is used as the white filler in the present invention, it is preferable to use a silane coupling agent together. Examples of usable silane coupling agents include sulfide silane coupling agents, mercapto silane coupling agents, vinyl silane coupling agents, amino silane coupling agents, glycidoxy silane coupling agents, nitro silane coupling agents, and chloro silane coupling agents. Preferred among these are sulfide silane coupling agents such as bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide. Particularly preferred is bis(3-triethoxysilylpropyl)disulfide.

In the case where the rubber composition contains a silane coupling agent, the silane coupling agent content is preferably 2 parts by mass or more, more preferably 6 parts by mass or more; and is preferably 15 parts by mass or less, more preferably 10 parts by mass or less, per 100 parts by mass of the silica. The silane coupling agent content in the range allows good processability, fuel economy, and tensile properties.

The total content of the carbon black and the white filler is preferably 30 parts by mass or more, more preferably 45 parts by mass or more, and still more preferably 50 parts by mass or more, per 100 parts by mass of the rubber component. Also, the total content is preferably 120 parts by mass or less, more preferably 100 parts by mass or less, and still more preferably 80 parts by mass or less. The total content of the carbon black and the white filler in the range contributes to good processability, fuel economy, and tensile properties.

The rubber composition of the present invention may preferably contain a phenolic resin. This can contribute to better processability, fuel economy, and tensile properties.

The type of usable phenolic resins is not particularly limited, and known resins can be used. In particular, non-reactive alkylphenol resins can be suitably used. The terms "non-reactive alkylphenol resins" used herein refers to alkylphenol resins that do not contain any reactive site at the ortho or para position (particularly, para position) to the hydroxyl group on the benzene ring in the chain. Herein, as the non-reactive alkyl phenol resin, compounds represented by the following formula (I) or (II) can be suitably used because they contribute to excellent processability, fuel economy, and tensile properties.

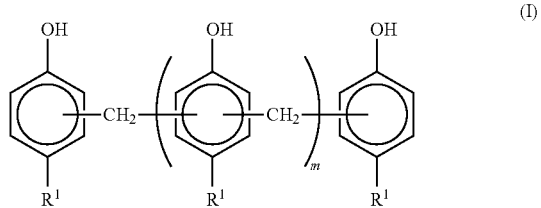

In formula (I), m is an integer. In terms of adequate blooming resistance, m is preferably 1 to 10, and more preferably 2 to 9. $R^1$'s are the same or different and each represent an alkyl group. In terms of affinity for rubber, the alkyl group preferably has 4 to 15 carbons, and more preferably 6 to 10 carbons.

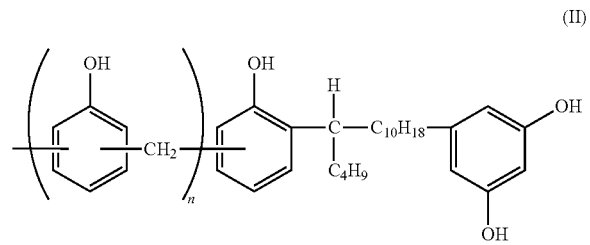

In formula (II), n is an integer. In terms of adequate blooming resistance, n is preferably 1 to 10, and more preferably 2 to 9.

The phenolic resin content is preferably 0.5 parts by mass or more, and more preferably 1.5 parts by mass or more, per 100 parts by mass of the rubber component. The content is preferably 8 parts by mass or less, and more preferably 2.5 parts by mass or less. The content in the range contributes to excellent processability, fuel economy, and tensile properties, and therefore these properties can be achieved at high levels.

Also, the total content of the compounds represented by formulae (I) and (II) is preferably 0.5 parts by mass or more, and more preferably 1.5 parts by mass or more, per 100 parts by mass of the rubber component. The total content is preferably 8 parts by mass or less, and more preferably 2.5 parts by mass or less. This contributes to excellent processability, fuel economy, and tensile properties, and therefore these properties can be achieved at high levels.

In the present invention, sulfur may preferably be used. The sulfur content is preferably 2 parts by mass or more, and more preferably 4 parts by mass or more, per 100 parts by mass of the rubber component. The content is preferably 7 parts by mass or less, more preferably 6 parts by mass or less, and still more preferably 5 parts by mass or less. The sulfur content in the range allows good processability, fuel economy, and tensile properties.

In the present invention, an amine antioxidant can be suitably used as an antioxidant because it provides excellent tensile properties. Examples of usable amine antioxidants include amine derivatives such as diphenylamines and p-phenylenediamines. Examples of the diphenylamine derivatives include p-(p-toluenesulfonylamide)-diphenylamine and octylated diphenylamine. Examples of the p-phenylenediamine derivatives include N-(1,3-dimethylbutyl)-N'-phenyl-p-phenylenediamine (6PPD), N-phenyl-N'-isopropyl-p-phenylenediamine (IPPD), and N,N'-di-2-naphthyl-p-phenylenediamine.

The antioxidant content is preferably 0.5 parts by mass or more, more preferably 1 part by mass or more; and is preferably 6 parts by mass or less, more preferably 4 parts by mass or less, per 100 parts by mass of the rubber component. The content in the range enables the achievement of good tensile properties.

In addition to the above-described ingredients, other compounding ingredients commonly used in the production of rubber compositions may appropriately be added into the rubber composition of the present invention. Examples include oil, stearic acid, zinc oxide, and vulcanization accelerators.

The rubber composition of the present invention can be prepared by an ordinary method. Specifically, the rubber composition can be prepared by, for example, a method in which the ingredients described above are mixed by a Banbury mixer, a kneader, an open roll mill or the like, and then vulcanized. In general, in the case of preparing a rubber composition containing natural rubber, the natural rubber is masticated before mixing ingredients such as rubber component and filler. Since the modified natural rubber is used in the present invention, ingredients can be mixed well without requiring mastication in advance, and therefore a desired rubber composition can be prepared.

The rubber composition of the present invention is used for undertreads for tires. An undertread is a component positioned between a tread rubber and a breaker (belt) rubber, and covers a part of the breaker rubber which faces the outer surface of the tire. Specific examples thereof include components disclosed in FIG. 1 of JP-A 2009-191132 and the like.

The pneumatic tire of the present invention can be prepared from the rubber composition by an ordinary method. Specifically, an unvulcanized rubber composition into which various additives are added as needed is extruded and processed according to the shape of an undertread for tires; and arranged and assembled with other tire components by an ordinary method using a tire building machine so as to form an unvulcanized tire. This unvulcanized tire is then heated and pressed in a vulcanizer, whereby a tire can be formed.

EXAMPLES

The present invention is specifically described below, with reference to examples, but the present invention is not limited to these examples.

The chemical agents used in Preparations are listed below. The chemical agents were purified by a usual method, if necessary.

Natural rubber latex: field latex (available from Muhibbah Lateks Sdn. Bhd.)
Surfactant: Emal-E27C (sodium polyoxyethylene lauryl ether sulfate) produced by Kao Corporation
NaOH: NaOH produced by Wako Pure Chemical Industries, Ltd.

Preparation of Saponified Natural Rubber

Preparation 1

The solids content (DRC) of natural rubber latex was adjusted to 30% (w/v). Subsequently, a 10% Emal-E27C aqueous solution (25 g) and a 40% NaOH aqueous solution (50 g) were added to the natural rubber latex (wet, 1000 g), and saponification reaction was carried out for 48 hours at room temperature. Thus, a saponified natural rubber latex was prepared. Water was added to the saponified latex to dilute to a DRC of 15% (w/v). Then, while the diluted latex was slowly stirred, formic acid was added thereto to adjust the pH to 4.0, so that the latex was coagulated.

The coagulated rubber was broken and immersed in a 1% sodium carbonate aqueous solution for 5 hours at room temperature. Subsequently, the rubber was taken out from the solution and repeatedly washed with 1000 mL of water. Then, the resulting rubber was dried for 4 hours at 90° C. into a solid rubber (saponified natural rubber A).

Preparation 2

A solid rubber (saponified natural rubber B) was obtained in the same manner as in Preparation 1, except that the amount of the 40% NaOH aqueous solution added was 25 g.

The solid rubbers (saponified natural rubbers A and B) formed in Preparations 1 and 2 and TSR were measured for nitrogen content, phosphorus content, and gel content by the following methods. Table 1 shows the results.

Determination of Nitrogen Content

The nitrogen content was determined with CHN CORDER MT-5 (Yanaco Analytical Instruments). In the determination, first, a calibration curve for determining the nitrogen content was prepared using antipyrine as the reference material. Then, about 10 mg of a sample was weighed out, and measured. The nitrogen content of the sample was determined as an average from three measurements.

Determination of Phosphorus Content

The phosphorus content of a sample was determined with an ICP optical emission spectrometer (ICPS-8100, produced by Shimadzu Corp.).

Additionally, for $^{31}$P-NMR measurement of phosphorus, a chloroform extract from the raw rubber was purified and dissolved in $CDCl_3$ to prepare a test sample. The test sample was analyzed with an NMR spectrometer (400 MHz, AV400M, produced by Bruker Japan Co., Ltd.), using the peak of P atoms measured in an 80% phosphoric acid aqueous solution as standard (0 ppm).

Determination of Gel Content

First, a 70.00 mg raw rubber sample cut into 1 mm×1 mm squares was weighed out, and 35 mL of toluene was added thereto. The mixture was allowed to stand still in a cool and dark place for one week. Next, the resulting mixture was centrifuged so that a toluene-insoluble gel fraction was precipitated, and a toluene-soluble supernatant was then removed. Then, the gel fraction alone was solidified with methanol and dried. The mass of the dried gel fraction was measured, and the gel content (%) was determined by the following formula:

Gel content (% by mass)=[mass of dried gel fraction (mg)]/[mass of original sample (mg)]×100.

TABLE 1

|  | Saponified natural rubber A (Preparation 1) | Saponified natural rubber B (Preparation 2) | TSR |
| --- | --- | --- | --- |
| Nitrogen content (% by mass) | 0.12 | 0.28 | 0.36 |
| Phosphorus content (ppm) | 82 | 127 | 602 |
| Gel content (% by mass) | 6.0 | 14.9 | 29.8 |

As shown in Table 1, the nitrogen content, the phosphorus content, and the gel content of the saponified natural rubbers A and B were lower than those of TSR.

In addition, in $^{31}$P-NMR measurement of the saponified natural rubbers A and B, no phospholipid peaks were observed in a range of −3 ppm to 1 ppm.

The chemical agents used in Examples and Comparative Examples are listed below.
Saponified natural rubber A: see Preparation 1
Saponified natural rubber B: see Preparation 2
Natural rubber: TSR20
Carbon black: Diablack LH (N326) ($N_2SA$: 84 $m^2/g$, DBP oil absorption: 74 mL/100 g) produced by Mitsubishi Chemical Corporation
Silica: Silica 115Gr ($N_2SA$: 110 $m^2/g$) produced by Rhodia Japan
Silane coupling agent: Si266 (bis(3-triethoxysilylpropyl) disulfide) produced by Degussa
Oil: Diana Process NH-70S produced by Idemitsu Kosan Co., Ltd
Phenolic resin: SP1068 produced by Schenectady International (non-reactive alkylphenol resin represented by formula (I) in which m is an integer of 1 to 10, and $R^1$ is an octyl group)
Antioxidant: Vulkanox 4020 (6PPD) produced by Bayer
Stearic acid: "TSUBAKI" produced by NOF Corporation
Zinc oxide: zinc oxide #3 produced by Mitsui Mining & Smelting Co., Ltd.
20% oil-treated insoluble sulfur: Mu-cron OT-20 (insoluble sulfur, treated with 20% oil) produced by Shikoku Chemicals Corporation
Vulcanization accelerator (1): NOCCELER NS (N-tert-butyl-2-benzothiazolylsulfenamide) produced by Ouchi Shinko Chemical Industrial Co., Ltd.
Vulcanization accelerator (2): NOCCELER DM-P (di-2-benzothiazolyl disulfide) produced by Ouchi Shinko Chemical Industrial Co., Ltd.

Examples and Comparative Examples

In accordance with the formulation shown in Table 2 or 3, the ingredients other than the sulfur and vulcanization accelerators were mixed with a 1.7-L Banbury mixer to provide a kneaded mixture. Next, the sulfur and vulcanization accelerators were added to the kneaded mixture, and they were mixed using an open roll mill, whereby an unvulcanized rubber composition was prepared.

The unvulcanized rubber composition thus prepared was vulcanized at 170° C. for 15 minutes to form a vulcanized rubber composition.

In Comparative Examples 1 and 2, natural rubber (TSR) was mixed with a peptizer (0.4 parts by mass per 100 parts by mass of TSR) and masticated in advance before use. In contrast, in Examples 1 to 8, mastication was not performed.

The obtained unvulcanized rubber compositions and vulcanized rubber compositions (vulcanizates) were evaluated as described below. Tables 2 and 3 show the evaluation results.

Processability

The prepared unvulcanized rubber compositions were measured for Mooney viscosity at 130° C. in accordance with the measurement method for Mooney viscosity specified in JIS K6300. The Mooney viscosity was expressed as an index (index of Mooney viscosity) using the following equation. The larger the index, the lower the Mooney viscosity, and in turn the better the processability.

(Index of Mooney viscosity)=($ML_{1+4}$ of Comparative Example 1 or 2)/($ML_{1+4}$ of each formulation)×100

Low Heat Build-Up Properties

The rubber composition (vulcanizate) of each formulation was measured for loss tangent (tan δ) using a viscoelasticity spectrometer VES (Iwamoto Seisakusho Co., Ltd.) under the following conditions: temperature 70° C.; initial strain 10%; dynamic strain 2%; and frequency 10 Hz. The loss tangent (tan δ) was expressed as an index (index of low heat build-up properties) using the following equation. The smaller the index, the better the fuel economy.

(Index of low heat build-up properties)=(tan δ of each formulation)/(tan δ of Comparative Example 1 or 2)×100

Elongation at Break

Each vulcanized rubber composition was subjected to thermal aging in an oven at 80° C. for 7 days, and the resulting composition was regarded as an aged sample.

The thus aged samples were subjected to a tensile test to measure elongation at break in accordance with JIS K 6251. The measurement results were expressed as indices with the value of Comparative Example 1 or 2 as 100. The larger the index, the better the elongation at break, and in turn the better the tensile properties.

TABLE 2

|  |  | Example 1 | Example 2 | Example 3 | Example 4 | Comparative Example 1 |
|---|---|---|---|---|---|---|
| Formulation (part(s) by mass) | Saponified natural rubber A | 80 | 100 | — | — | — |
|  | Saponified natural rubber B | — | — | 80 | 100 | — |
|  | Natural rubber | 20 | — | 20 | — | 100 |
|  | Carbon black | 63 | 63 | 63 | 63 | 63 |
|  | Silica | — | — | — | — | — |
|  | Silane coupling agent | — | — | — | — | — |
|  | Oil | 2 | 2 | 2 | 2 | 2 |
|  | Phenolic resin | 2 | 2 | 2 | 2 | 2 |
|  | Antioxidant | 1 | 1 | 1 | 1 | 1 |
|  | Stearic acid | 1.5 | 1.5 | 1.5 | 1.5 | 1.5 |
|  | Zinc oxide | 6 | 6 | 6 | 6 | 6 |
|  | 20% oil-treated insoluble sulfur | 6.25 | 6.25 | 6.25 | 6.25 | 6.25 |
|  | Vulcanization accelerator (1) | 0.5 | 0.5 | 0.5 | 0.5 | 0.5 |
|  | Vulcanization accelerator (2) | 0.75 | 0.75 | 0.75 | 0.75 | 0.75 |
| Evaluation | Index of Mooney viscosity | 95 | 103 | 90 | 106 | 100 |
|  | Index of low heat build-up properties | 96 | 94 | 96 | 94 | 100 |
|  | Index of elongation at break | 107 | 103 | 105 | 101 | 100 |

TABLE 3

|  |  | Example 5 | Example 6 | Example 7 | Example 8 | Comparative Example 2 |
|---|---|---|---|---|---|---|
| Formulation (part(s) by mass) | Saponified natural rubber A | 80 | 100 | — | — | — |
|  | Saponified natural rubber B | — | — | 80 | 100 | — |
|  | Natural rubber | 20 | — | 20 | — | 100 |
|  | Carbon black | 40 | 40 | 40 | 40 | 40 |
|  | Silica | 23 | 23 | 23 | 23 | 23 |
|  | Silane coupling agent | 1.84 | 1.84 | 1.84 | 1.84 | 1.84 |
|  | Oil | 2 | 2 | 2 | 2 | 2 |
|  | Phenolic resin | 2 | 2 | 2 | 2 | 2 |
|  | Antioxidant | 1 | 1 | 1 | 1 | 1 |
|  | Stearic acid | 1.5 | 1.5 | 1.5 | 1.5 | 1.5 |
|  | Zinc oxide | 6 | 6 | 6 | 6 | 6 |
|  | 20% oil-treated insoluble sulfur | 6.25 | 6.25 | 6.25 | 6.25 | 6.25 |
|  | Vulcanization accelerator (1) | 0.5 | 0.5 | 0.5 | 0.5 | 0.5 |
|  | Vulcanization accelerator (2) | 1.25 | 1.25 | 1.25 | 1.25 | 1.25 |
| Evaluation | Index of Mooney viscosity | 96 | 105 | 90 | 102 | 100 |
|  | Index of low heat build-up properties | 92 | 90 | 92 | 90 | 100 |
|  | Index of elongation at break | 105 | 101 | 103 | 100 | 100 |

As shown in Tables 2 and 3, with respect to all formulations containing carbon black and/or silica, Examples using a modified natural rubber with a phosphorus content of 200 ppm or less (i.e., saponified natural rubber A or B) exhibited a balanced improvement in processability, fuel economy, and the elongation at break after aging.

Further, in the case where natural rubber was used in combination with the modified natural rubber, rubber compositions were successfully prepared without mastication of natural rubber (Examples 1, 3, 5, and 7).

What is claimed is:

1. A method for producing a pneumatic tire having an undertread, comprising:
    step (A) of saponifying natural rubber latex to prepare a saponified natural rubber latex;
    step (B) of coagulating the saponified natural rubber latex and treating the resulting coagulated rubber with alkali;
    step (C) of washing the resulting rubber until the phosphorus content in rubber falls to 200 ppm or less to produce a modified natural rubber having a phosphorus content of 200 ppm or less; and
    step (D) of mixing the modified natural rubber and at least one of the carbon black and white filler to produce a rubber composition; and
    step (E) of producing the undertread from the rubber composition and producing the pneumatic tire having the undertread,
    wherein the alkali is at least one selected from the group consisting of potassium carbonate, sodium carbonate, sodium hydrogen carbonate, potassium hydrogen carbonate, lithium carbonate, lithium hydrogen carbonate, and aqueous ammonia.

2. A method for producing a pneumatic tire having an undertread according to claim 1,
    wherein the step (D) is that of further mixing an alkylphenol resin represented by formula (I):

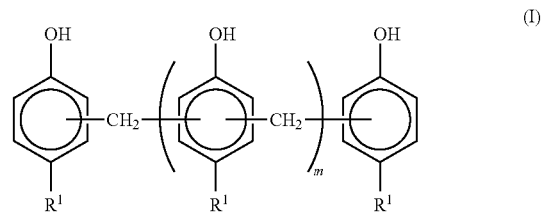

wherein m is an integer and $R^1$s are the same or different and each represent an alkyl group.

* * * * *